UNITED STATES PATENT OFFICE.

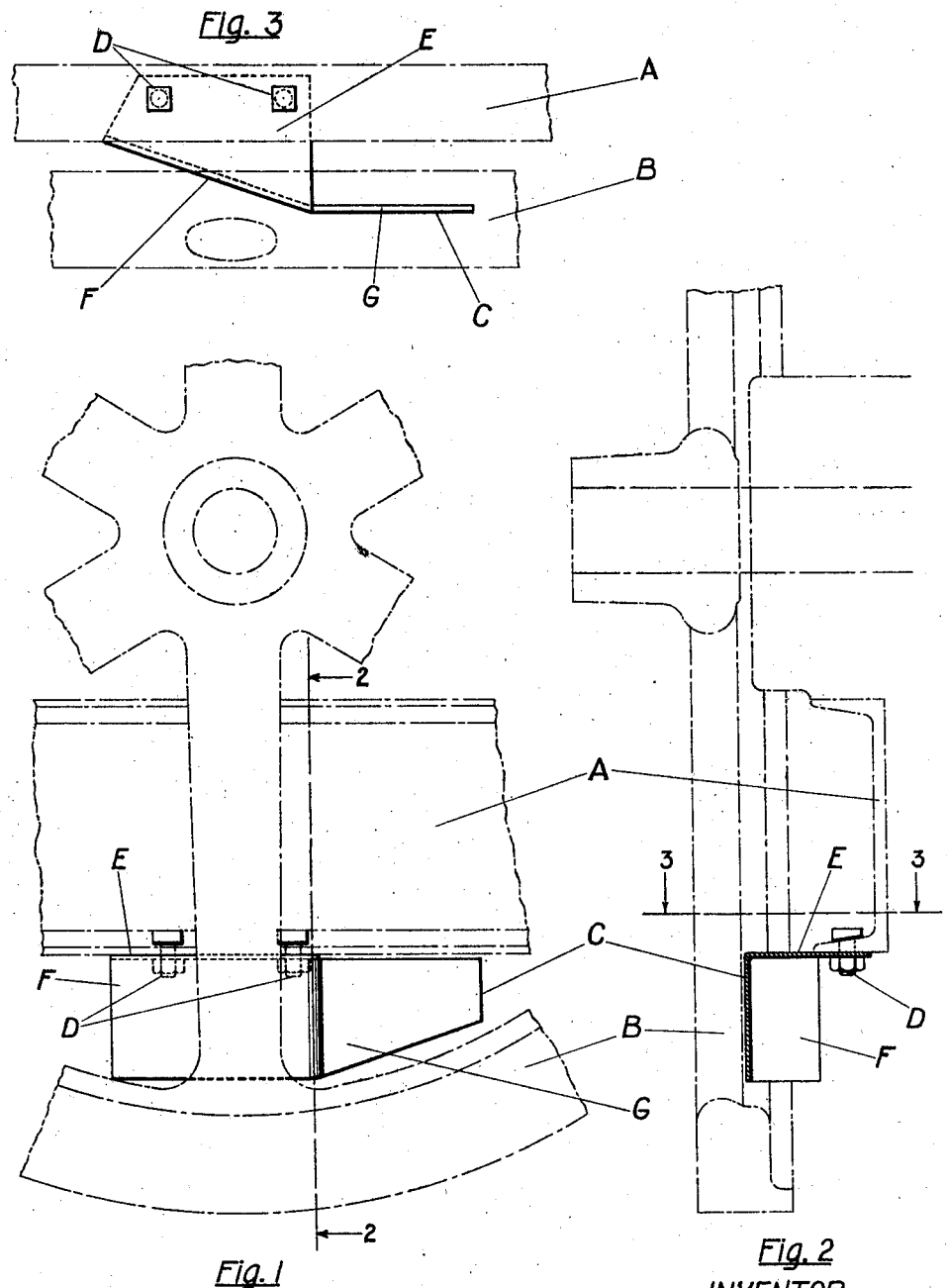

JOHN A. SECOR, OF LAPORTE, INDIANA, ASSIGNOR TO ADVANCE-RUMELY COMPANY, OF LAPORTE, INDIANA, A CORPORATION OF INDIANA.

FOOT-GUARD FOR FLYWHEELS.

1,333,135.  Specification of Letters Patent.  Patented Mar. 9, 1920.

Application filed April 26, 1919. Serial No. 292,784.

*To all whom it may concern:*

Be it known that I, JOHN A. SECOR, a citizen of the United States, residing at Laporte, Indiana, in the county of Laporte and State of Indiana, have invented a certain new and useful Improvement in Foot-Guards for Flywheels, of which the following is a specification.

My invention relates to a foot guard to be applied to a tractor frame, and has for purpose, the prevention of accidents when the tractor fly wheel is started by a push of the foot. I have found that most operators press their foot against one of the spokes of the fly wheel when starting it and if the foot is not withdrawn in time it may be caught between the spoke and the tractor frame, or otherwise injured.

My invention is illustrated more or less diagrammatically in the following drawings wherein—

Figure 1 is an elevation of a fly wheel and tractor frame with my device in place;

Fig. 2 is a section on the line 2—2 of Fig. 1;

Fig. 3 is a section on the line 3—3 of Fig. 2

Like parts are indicated by like characters in all the figures

A is a tractor frame or a member thereof, and B is a fly wheel suitably mounted thereon. C is a guard member secured to the tractor frame as by the bolts D. As shown in Fig. 2, the foot guard fits within the rim of the fly wheel It is composed of an outwardly extending member E with a downwardly extending deflecting flange F, and a projection G of said flange parallel with and almost in contact with the plane of rotation of the fly wheel spokes. The deflecting flange F, and the side of the member E from which it depends are inclined outwardly from said plane of rotation. The outer edge of the deflecting flange or plate F is outside the plane of rotation of even the rim of the wheel, as shown in Fig. 2. The shape and inclination and relative size of these parts, as well as the method of attachment, are susceptible of great variation without departure from the spirit of my invention and I wish my drawings to be regarded as in a real sense diagrammatic.

It will be understood, of course, that the application of my device is not limited to fly wheels but may be of value in the case of a great variety of moving parts.

The use and operation of my invention are as follows:

The operator generally starts the fly wheel by pressing his foot against one of the spokes and giving it a shove. If he does not withdraw his foot in time, it may be carried around by the wheel and be caught by the spokes and jammed against the tractor frame. When my foot guard is applied, such accidents are made impossible because the foot of the operator will be caught on the depending flange or guard, which is inclined across the plane of rotation, and will be given a glancing blow by it, which will throw it out from between the spokes, and to a safe distance beyond the plane of rotation of the fly wheel.

I claim:—

1. The combination with a fly wheel and means for mounting and rotating it, of a foot guard comprising a deflecting member mounted within the periphery of the fly wheel, and adjacent the plane of rotation of the fly wheel spokes, said member comprising a plate inclined to said plane of rotation, and adapted when the operator starts the wheel with a shove of the foot, to contact the foot and deflect it away from said plane of rotation.

2. In a fly wheel foot guard, the combination with a fly wheel and means for mounting and rotating it, of a deflecting plate mounted within the periphery of the fly wheel and adjacent its plane of rotation and inclined thereto, the inner edge of the plate being closely adjacent the plane of rotation of the fly wheel spokes.

3. In a fly wheel foot guard, the combination with a fly wheel and means for mounting and rotating it, of a deflecting member fixed adjacent the plane of rotation of said fly wheel, and within its periphery, said member comprising a plate inclined to the plane of rotation of the fly wheel, and an extension therefrom parallel with said plane of rotation and closely adjacent thereto.

4. In a fly wheel foot guard, the combination with a fly wheel and means for mounting and rotating it, of a deflecting member fixed adjacent the plane of rotation of said fly wheel within and adjacent its periphery, its inner edge being closely adjacent the plane of rotation of the fly wheel spokes, its outer edge being substantially removed therefrom and facing in an opposite direction to the rotation of the fly wheel In testimony whereof, I affix my signature in the presence of two witnesses this 18th day of April 1919.

JOHN A. SECOR.

Witnesses:
J. G. KRENZKE,
R. R. LEONARD.